April 21, 1925.                    1,534,284
A. J. PELLETIER
TIRE CHAIN TOOL
Filed Dec. 5, 1923

INVENTOR
Alphonse J. Pelletier
BY Rob't P. Harris
ATTORNEY

Patented Apr. 21, 1925.

1,534,284

UNITED STATES PATENT OFFICE.

ALPHONSE J. PELLETIER, OF GREENVILLE, NEW HAMPSHIRE.

TIRE-CHAIN TOOL.

Application filed December 5, 1923. Serial No. 678,651.

*To all whom it may concern:*

Be it known that I, ALPHONSE J. PELLETIER, a citizen of the United States, residing at Greenville, in the county of Hillsborough and State of New Hampshire, have invented an Improvement in Tire-Chain Tools, of which the following description, in connection with the accompanying drawings, is a specification, like characters on the drawings representing like parts.

This invention relates to a non-skid chain applying tool.

Everyone who has attempted to apply a non-skid chain to the wheel of an automobile is aware of the fact that considerable difficulty is experienced in drawing the side chains sufficiently tight about the tire to enable the ends of the chain to be secured together. The first of a pair of side chains may be secured about a wheel without serious difficulty but when it is attempted to secure the second side chain of a pair about a wheel, the same is usually held out of place by the cross-chains, and it is difficult to draw the second side chain tight enough to cause its ends to meet.

Various types of tools have been proposed for drawing the ends of tire chains together about an automobile tire, but difficulty is experienced in using these tools due to the tendency of the end link to slip outwardly along the tool when pressure is first applied, and the proposed tools are open to other objections.

The present invention therefore relates to a non-skid chain applying tool which is so constructed that its use enables tire chains to be applied more readily than heretofore.

One important feature of the present invention resides in the curved construction of the tool whereby the link to be drawn towards its cooperating hook engages and slides along the concave surface of the bent portion of the tool. This curved portion of the tool reduces the tendency of the link to slip outwardly along the tool when pressure is first applied to the tool, and it serves also to guide the link gradually into engagement with its hook.

Another feature of the invention resides in the construction of the hook engaging portion of the tool whereby the tool is held in engagement with the free end of the hook and guides the link into engagement with the hook.

Other features of the invention in addition to the above will be hereinafter described in connection with the accompanying drawings, wherein.

Figure 1:
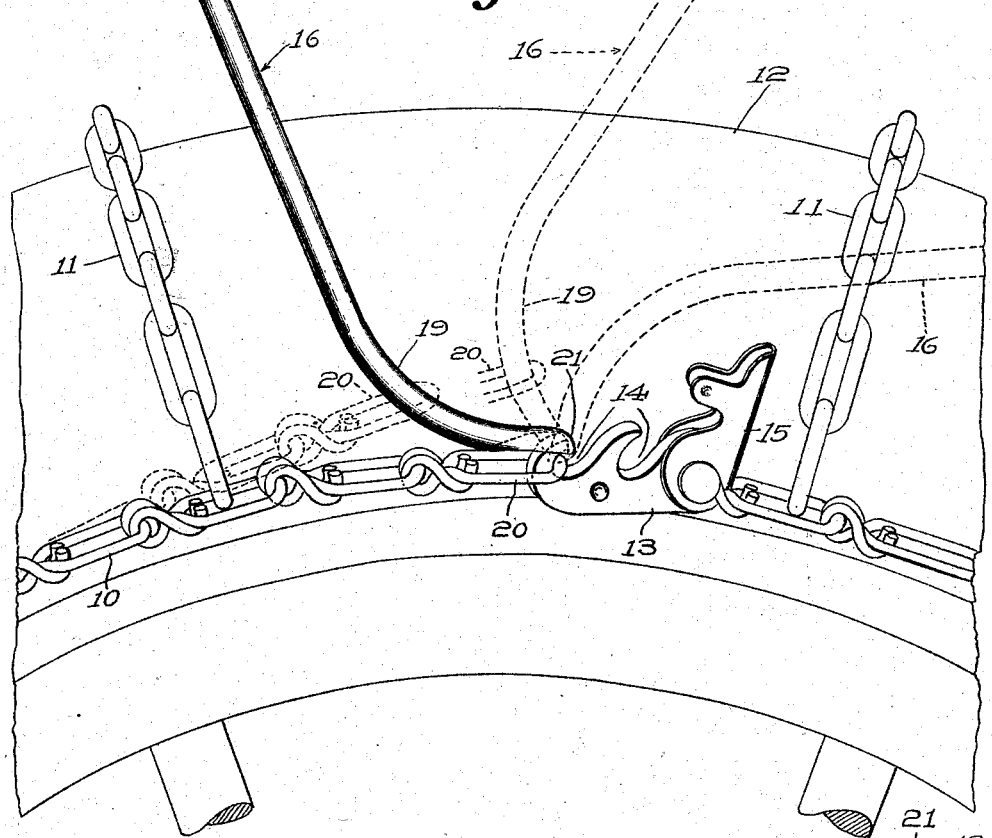
Fig. 1 is a perspective view showing the tool of the present invention in use, the same being shown in full lines in one position and in dotted lines in two other positions.
Figure 2:
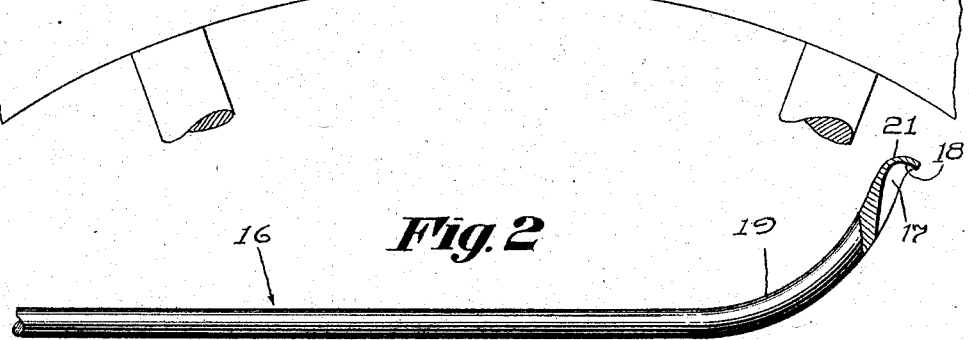
Fig. 2 is a side view of the tire chain tool.
Figure 3:
Fig. 3 is a view looking towards the convex surface of the bent portion of the tool.

In the drawing 10 is one of the side chains of a well-known type of non-skid chain having the cross-chains 11 and applied to an automobile tire 12. Each side chain is commonly provided with a hook 13 having the link receiving notches 14 and the keeper or lock 15 for preventing the link from escaping from either notch.

As stated, after a non-skid chain has been placed about a tire, it is usually difficult to draw the ends of the side chains together so that they can be connected, and to lessen this difficulty various different tools have been proposed comprising levers adapted to be inserted through an end link of a side chain and then engaged with the chain receiving hook to force the ends of the chain together.

The present invention is directed to a tire chain tool 16 in the form of a bar, the greater portion of which may be straight to form a shank adapted to be engaged by the hand, and the inner end portion of the tool is provided with a pocket 17 adapted to receive a free end of the hook 13. The inner end of the tool 16 is provided with a lip or wall 18 adapted to hold the end of the tool in engagement with the hook 13 and with a free end of the hook extending into the pocket 17, as will be apparent from Fig. 1. The inner end portion of the tool 16 is disposed at a substantial angle to the shank portion and is connected to the shank by a gradually curved portion 19, the inner or concave face of which engages an end link 20 of the side chain and guides this link into engagement with a notch 14 as the tool is moved in the chain tightening position.

Since the link 20 engages the inner curved face 19 of the tool, or, in other words, since an intermediate portion of the tool is bent as shown, the tool will not tend to twist in the hand as pressure is exerted upon the same in the chain tightening direction.

Furthermore, the curve 19 of the tool reduces the tendency of the link to slip outwardly along the tool, and serves also to guide the link gradually into one of the notches 14 depending whether the tool is engaged with the first or second free end of the hook 13. Upon noting the tool 16, as shown in dotted lines in an intermediate position, it will be seen that the link 20 has moved downwardly somewhat along the tool and extends at approximately right angles to the curved face it engages, and it will be apparent that the link will move downwardly gradually along the curved surface 19 as the angular position of the latter changes. As a result, the link is guided smoothly towards its hook and slips over the rounded end 21 of the tool into a notch 14.

What is claimed is:

1. A non-skid tire chain applying tool formed of a bar having a shank adapted to be grasped by the hand and having a pocket adjacent its inner end to receive the free end of the hook of a non-skid chain, and a lip at the inner end of the bar to engage said hook and hold the bar upon the hook with the latter projecting into the pocket, said bar having its inner end portion disposed at a substantial angle to the shank and connected to the shank by a curved portion bowed toward the portion of the chain it engages and the concave surface of which is adapted to engage a link of a chain and to guide the link into engagement with the hook as the bar is moved in the chain tightening direction.

2. A non-skid tire chain applying tool formed of a bar having a shank adapted to be grasped by the hand and having a pocket adjacent its inner end to receive the free end of the hook of a non-skid chain and the pocket having an end wall to engage the hook and hold the bar upon the hook with the latter projecting into the pocket, said bar having an intermediate portion bent on a gradual curve to form a link engaging concave surface adapted to guide a link of a chain into engagement with the hook as the bar is moved in the chain tightening direction.

In testimony whereof, I have signed my name to this specification.

ALPHONSE J. PELLETIER.